United States Patent [19]
Liao et al.

[11] Patent Number: 6,105,674
[45] Date of Patent: *Aug. 22, 2000

[54] COMPOSITION AND METHOD FOR RECOVERING LOST CIRCULATION AND SEALING EARTH BOREHOLES AND CAVITIES

[75] Inventors: W. Andrew Liao, Kingwood; James A. Nattier, Houston, both of Tex.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/019,218

[22] Filed: Feb. 5, 1998

[51] Int. Cl.⁷ .................................................. E21B 33/138
[52] U.S. Cl. ............................. 166/292; 166/295; 175/72
[58] Field of Search .................................... 166/292, 294, 166/295; 175/72

[56] References Cited

U.S. PATENT DOCUMENTS

| | | |
|---|---|---|
| 2,836,555 | 5/1958 | Armentrout . |
| 3,082,823 | 3/1963 | Hower . |
| 3,909,421 | 9/1975 | Gaddis . |
| 4,078,612 | 3/1978 | Gallus . |
| 4,128,528 | 12/1978 | Frisque et al. . |
| 4,261,422 | 4/1981 | White et al. . |
| 4,391,925 | 7/1983 | Mintz et al. . |
| 4,442,241 | 4/1984 | Drake et al. . |
| 4,445,576 | 5/1984 | Drake et al. . |
| 4,463,808 | 8/1984 | Mason et al. . |
| 4,463,929 | 8/1984 | Dantigraber et al. . |
| 4,475,594 | 10/1984 | Drake et al. . |
| 4,498,995 | 2/1985 | Gockel . |
| 4,503,170 | 3/1985 | Drake et al. . |
| 4,551,256 | 11/1985 | Kita et al. . |
| 4,633,950 | 1/1987 | Delhommer et al. ................. 175/72 X |
| 4,635,726 | 1/1987 | Walker ................................... 166/294 |
| 4,664,816 | 5/1987 | Walker ................................... 175/72 X |
| 4,704,213 | 11/1987 | Delhommer et al. ................. 175/72 X |
| 4,836,940 | 6/1989 | Alexander . |
| 4,948,428 | 8/1990 | Liao . |
| 5,389,146 | 2/1995 | Liao . |

OTHER PUBLICATIONS

David D. Wilson: "Something New in Environmental Horizontal Installation." *WWJ*, Feb. 1996, pp. 27–28.

Jeff Griffin: "Horizontal Remediation Wells." *WWJ*, Oct. 1996, pp. 48–49.

Feature: Horizontal Barrier Wells: DTI Does the Jobs. *WWJ*, Nov. 1997, pp. 50–52.

"Horizontal Remediation Wells Clean Up Jet Fuel." *Public Works*, Sep. 1996, pp. 45–46.

David D. Wilson: "New HW Installation Method: Search May Be Over for an Industry Standard." *Horizontal Well Market Report*, vol. 1, No. 1, Feb. 1996, pp. 1–2.

"Finding a Better Way to Drain America's Landfills," *Public Works*, Jan. 1997, pp. 33–35.

*Primary Examiner*—Frank Tsay
*Attorney, Agent, or Firm*—Craig W. Roddy; Karen B. Tripp

[57] ABSTRACT

Granular sodium bentonite particles in the size range of 8 mesh to 20 mesh, preferably in the size range of 8 mesh to 14 mesh, are coated with a solution of a copolymer of polyacrylamide and polyacrylate (PHPA) in a liquid emulsion form, including mineral oil as a carrier fluid, in proportions of 67% and 33%, by weight, respectively. The coated particles are mixed with water in proportions of 17–30 gallons, preferably 28 gallons, of water to each 50 pounds of coated particles to form a slurry, which is then pumped into an earth borehole to seal, gout or plug the borehole.

41 Claims, No Drawings

COMPOSITION AND METHOD FOR RECOVERING LOST CIRCULATION AND SEALING EARTH BOREHOLES AND CAVITIES

BRIEF DESCRIPTION OF THE INVENTION

This invention relates, generally, to methods and compositions for sealing, grouting or plugging earth boreholes or cavities, and specifically, to sealing, grouting or plugging such boreholes or cavities while water is flowing in or out of such boreholes or cavities. More particularly, the invention relates to methods and compositions involving surface-modified, granular sodium bentonite mixed with water, resulting in a pumpable, rehydratable slurry for use in grouting conduits such as casing, tubing, and the like, and in plugging earth cavities and in sealing fractured rock formations.

BACKGROUND OF THE INVENTION

In the drilling of earth boreholes, especially in the drilling of shallow water wells in unconsolidated formations such as sand and cobblestones, it is fairly common to encounter water flowing out of the well to the earth's surfaces which flow must be controlled. To merely pour wet cement into the earth borehole will quite often result only in the flowing water pushing the wet cement out of the borehole, with little or no reduction in the water flow.

An associated problem involves the fracturing of the formation while drilling, resulting in the fluid in the borehole being lost to the formation, commonly referred to as "lost circulation".

Still another problem resides in the grouting of tubulars in an earth borehole. Grouting is the placement of a suitable material with a low permeability and high structural stability into the annular space between the casing and the wellbore, or between the casing and the inner pipe such as tubing. The main functions of grouting and sealing a well or earthen cavity are to (1) restore the earth formation outside the casing to its original condition, (2) prevent commingling of two aquifers, (3) stop seepage of polluted surface water downwardly along the exterior of the casing into the well, and (4) preserve the hydraulic characteristics of an artesian formation and to prevent leakage upwardly along the exterior of the casing.

Two types of material are frequently used for grouting a well. One is bentonitic grout consisting of a high-yield, swellable bentonite clay, particularly sodium-based bentonite containing sodium montmorillonite; and another is cementitious grout consisting of cement or silicate-based material with the addition of a small percentage by weight (4% to 8%) of sodium bentonite to enhance grout bonding strength. Each type of grouting material has its advantages and disadvantages. Cementitious grouts are, in general, less economical than bentonitic grouts, and have a higher slurry density (13 to 15 lb/gal) and a higher slurry pH (above 12.5) than that of bentonitic grouts. The major drawbacks of cementitious grouts are that they are not cost effective, and they have a tendency to fracture the surrounding earth formations due to their heavy slurry weight (density). U.S. Pat. Nos. 4,463,808, 4,948,428, and 5,389,146 each disclose the use of bentonitic grouts.

U.S. Pat. No. 4,463,929 to Mason et al. describes a method of preparing a bentonitic grout for sealing an earthen borehole. It involves a two-step preparation by adding a granular, water swellable clay such as Wyoming sodium bentonite to a pre-mixed water solution containing 0.1% to about 0.5% by weight of a water dispensable hydrolyzed polyacrylamide polymer. The amount of swellable clay should be in a concentration from 2 to 4 pounds per gallon of pre-mixed polymer dispersed in water. The polymer in this patent is in emulsion form and is dispersed in water first before it comes in contact with clay particles.

U.S. Pat. Nos. 4,948,428 to Liao describes a pumpable, rehydratable grout composition comprising a water-swellable clay, such as sodium bentonite, and an aqueous mixture comprised of a hectorite, non-swellable clay, an alkaline metals tetraborate, an alkaline metal carbonate and an alkaline metal chloride, the grout composition being useful in the sealing of earthen formations such as the grouting of conduits in wellbores. The disclosure involves a two-step grout preparation. The first step is to add a fixed amount of the aforementioned aqueous mixture to make-up water, and the second step involves the addition of water-swellable sodium bentonite clay to the above aqueous, inorganic solution. The aqueous mixture contains a mixture of inorganic alkaline salts intended for use as a dispersant to disperse clay particles so that they will not stick together while swelling once in contact with water. The principle mechanism of this patent is dispersion initiated by the dispersants in the aqueous mixture.

U.S. Pat. No. 5,389,146 to Liao discloses a grouting composition, containing no organic polymeric substance, mixed with freshwater in one-step addition to provide a pumpable, rehydratable, and easily applied grouting slurry. This patent describes a grout composition comprised of a mixture of water-swellable clay, such as granular sodium bentonite (88 to 90%) with a particle size distribution ranging from 150 to 600 micrometers, sepiolite (1 to 8%) and a clay stabilizer (4 to 8%). The composition can be added to freshwater directly to provide a pumpable grout slurry for sealing the annular space around a well casing and plugging abandoned wells. The principle of this patent relies on the clay stabilizer in the grout composition as a dispersant to disperse sodium bentonite clay particles so that more clay particles can be introduced into the slurry to form a high solids grout.

U.S. Pat. No. 4,836,940 to William Alexander discloses the use of a homogeneous pellet made from a mixture of sodium bentonite with a water absorbing polymer to provide sealing and plugging of earth formations surrounding an earth borehole. By way of further example, in U.S. Pat. No. 4,551,256 to Kita et al., there is a disclosure of composite inorganic powder particles coated with various water absorbing resins. The composite particles are pulverized to result in powder particles which are then used to make a slurry for drilling earth boreholes.

U.S. Pat. No. 2,836,555 to Armentrout discloses a pellet containing compressed, dehydrated, swellable bentonite clay coated with a water insoluble coating which is impervious to the ingress of water except at a restricted entrance, whereby the pellet may be introduced into a water containing mixture, pumped into a well, and ingress of water to the clay within the coating is controlled to an extent which will cause the clay to expand and rupture the pellet, an event which is delayed until the pellet has had an adequate opportunity to be carried by the mixture to the desired location, after which the clay may absorb water, swell, and rupture the pellet, exposing more of the clay to water absorption and swelling. The coating used in this patent contains a water-insoluble compound which forms an impermeable film on the surface of the pellet except in a small restricted area. When this coated pellet is introduced in a borehole, the hole on the surface of the pellet is the only spot where water comes in contact with the swellable clay. The surface coating used on the pellet is preferably of a thermosetting character so that it will not soften or become plastic under the temperature conditions encountered in deep wells. The particular nature of the water insoluble coating may vary considerably. Urea formaldehyde adhesives are suitable for this purpose in that they are thermosetting and are water resistant. Other synthetic resins which are water resistant and which will not soften under the temperatures encountered in wells may be used in lieu thereof. Such resins frequently are soluble in volatile organic solvents such as a mixture of ethyl alcohol (1%) and methylene chloride (9%), and a mixture of butyl acetate, toluene, ethyl alcohol and butanol, and may be applied in the form of solutions after which the solvents evaporate away, leaving the resins enclosing the pellet and forming a water resistant and temperature resistant coating. The preferable coating described in the patent includes cellulose acetate, urea formaldehyde, uric resins, polystyrene and nitrocellulose. The coatings aforementioned prevent ingress of water to the bentonite clay except through a small entrance. This entrance may be formed by puncturing or drilling a hole into the body of the coated pellet. The entrance and the hole are preferably of a very small size, so small that while water may be forced therein under pressure, water will not readily enter, particularly against any air that may be entrapped in the hole.

Recovering Lost Circulation Materials

During the drilling and production of wells, such as oil, gas or water wells, various problems sometimes occur which, if not corrected, result in the loss of considerable well production and even the loss of the well itself. These problems include blowouts, lost circulation and channeling. Surface blowouts occur when the drill bit cuts into a high pressure zone of gas, oil or water which can blowout the drilling mud and sometimes even the drill stem, bit and surface equipment resulting in their loss and destruction also. Underground blowouts occur when a fluid in one porous formation flows into the wellbore and out of the wellbore into another porous formation. Lost circulation of drilling mud occurs when the drill bit cuts through a porous formation at a pressure such that drilling mud coming down the drill stem and well casing is lost to the formation having a lower internal pressure. Channeling occurs when a fluid in one porous formation flows through continuous passages in cement behind well casing into another porous formation at a different depth in the well.

It is well known in the prior art that a variety of different substances are pumped down wellbores in attempts to reduce the large losses of drilling fluid to fractures and the like in the surrounding formation. Different forms of cellulose are the preferred materials employed. Some other substances which have been pumped into wellbores to control lost circulation are almond hulls, walnut hulls, bagasse, dried tumbleweed, paper, coarse and fine ica, and even pieces of rubber tires. These and other prior art additives are described in U.S. Pat. No. 4,498,995.

Another process that is employed in the prior art to close off large lost circulation problems is referred to in the art as gunk squeeze. In the gunk squeeze process, a quantity of powdered bentonite is mixed in diesel oil and pumped down the wellbore. Water injection follows the bentonite and diesel oil. If mixed well, the water and bentonite will harden to form a gunky semi-solid mass, which will reduce lost circulation. Problems frequently occur in trying to adequately mix the bentonite and the water in the well. The bentonite must also be kept dry until it reaches the desired point in the well. The method is disclosed in U.S. Pat. No. 3,082,823.

U.S. Pat. No. 4,261,422 describes the use of an expandable clay such as bentonite or montmorillonite which is dispersed in a liquid hydrocarbon for injection into the well. After injection, the bentonite or montmorillonite will expand upon contact with water in the formation. Thus, it is hoped that the expanding clay will close off producing intervals but not harm oil producing intervals.

It has also been proposed to mix bentonite with water in the presence of a water soluble polymer which will flocculate and congeal the clay to form a much stronger and stiffer cement-like plug than will form if only bentonite is mixed with water. U.S. Pat. No. 3,909,421 discloses such a fluid made by blending a dry powdered polyacrylamide with bentonite followed by mixing the powder blend with water. U.S. Pat. No. 4,128,528 discloses a powdered bentonite/polyacrylamide thickening composition prepared by mixing a water-in-oil emulsion with bentonite to form a powdered composition which rapidly becomes a viscous stiff material when mixed with water. U.S. Pat. Nos. 4,503,170; 4,475,594; 4,445,576; 4,442,241; and 4,391,925 each disclose the use of a water expandable clay dispersed in the oily phase of water-in-oil emulsion containing a surfactant to stabilize the emulsion and a polymer dispersed in the aqueous phase. When the emulsion is sheared, it breaks and a bentonite paste is formed which hardens into a cement-like plug. These patents disclose the use of such polymers as polyacrylamide, polyethylene oxide and copolymers of acrylamide and acrylic or methacrylic acid.

An encapsulated material which has been proposed for use in boreholes is described in U.S. Pat. No. 4,078,612. The patent describes an explodable material encapsulated in natural gums slurried in a liquid vehicle. The material is pumped into the formation around the wellbore and exploded to decrease the permeability of the formation.

All of the above-discussed prior art suffer from a common problem, that of being able to offer a one-step solution to the problem of being able to take a product to the field, mix it with water, and pump the mixture into the earth borehole as a grouting solution, as a fracture sealing solution or as a plugging solution.

OBJECTS OF THE INVENTION

It is therefore the primary object of the present invention to provide new and improved methods and compositions for grouting tubulars in earth boreholes.

It is another object of the present invention to provide new and improved methods and compositions for sealing fractures in earth formations surrounding earth boreholes.

It is yet another object of the present invention to provide new and improved methods and compositions for plugging earth boreholes.

SUMMARY OF THE INVENTION

These and other objects, features and advantages of the present invention are achieved, generally, by methods and compositions involving surface-coated, granular sodium bentonite particles having a controlled rate of swelling when mixed with water, the rate of swelling being inversely proportional to the coating thickness.

As a feature of the invention, the coating comprises a copolymer of polyacrylamide and polyacrylate (PHPA) in liquid emulsion form, preferably sprayed directly on the granular sodium bentonite particles. The coated, granular sodium bentonite particles are then packaged and sent to the field. In use, the process involves only the single step of adding the product to water, which can be fresh water, salt water, dirty water, etc. to form a slurry, and then pumping the slurry into the earth borehole. The surface-coated sodium bentonite particles then swell in-situ to form an impermeable seal.

DETAILED DESCRIPTION OF THE PREFERRED EMBODIMENT OF THE INVENTION

In formulating a product which involves only a single step, viz., adding the product to water, there were several design parameters to be addressed. Sodium bentonite, sometimes known as Wyoming bentonite, and sometimes referred to as swellable bentonite because of its inate ability to swell when exposed to water, is an excellent starting material. In sealing a fracture in an earth formation, for example, sodium bentonite will swell, when hydrated, to fill the fracture. Likewise, when forming a plug, the sodium bentonite will swell, when hydrated, to plug the entire wellbore if desired.

The inherent problem with the swelling process is that of timing, i.e., that of having the swelling occur only when the bentonite particles are in the desired location in the wellbore. The present invention provides methods and compositions which actually retard or delay the swelling of the sodium bentonite in a controlled manner.

The invention uses a copolymer coating process, in which the coating is sprayed over sodium bentonite particles having an optimized particle size range, and in which the coating depth is carefully controlled.

With such process, the swelling of the sodium bentonite when added to the makeup water at the site of the earth borehole being treated, is retarded to the extent of allowing the coated particles to be pumped into place before any sizeable swelling of the bentonite has occurred.

The preferred copolymer is a copolymer of polyacrylamide and polyacrylate, viz., partially hydrolyzed polyacrylamide, commonly known as PHPA, in a liquid emulsion form. The carrier preferably used with the copolymer is mineral oil. If too little mineral oil is used, the coating will be sticky and ineffective. If too much mineral oil is used, the coating will also be ineffective.

Before the carrier oil, preferably a mineral oil, is joined with the polymer, the polymer is combined with mineral oil to form a liquid PHPA emulsion, the emulsion preferably being 67% mineral oil and 33% PHPA. The liquid phase (see Table 1, for example) is preferably 67% liquid PHPA emulsion and 33% carrier fluid, preferably a mineral oil. Using those numbers as an example, the liquid phase thus contains 22.11% PHPA (0.67×0.33), 44.89% mineral oil (0.67×0.67) in the liquid PHPA emulsion, and 33% mineral oil as the carrier fluid. We have found that the mixture of the liquid emulsion polymer with the mineral oil should be in the range of 25–50% mineral oil and the remainder should be the preferred liquid emulsion copolymer, with the optimized ratio being 33% mineral oil, 67% liquid emulsion copolymer, with all of the percentages being weight percent.

PHPA is a water soluble, water dispersible polymer having fairly significant mobility, a factor which is believed to account for its effectiveness as a coating of the granular particles in accord with the present invention. If a crack or other opening occurs in the coating the polymer moves into and "heals" the crack or other opening in the coating, thus preventing the sodium bentonite from being exposed prematurely to the water, which would otherwise result in premature swelling of the clay. In essence, the coating remains intact and complete over the entire surface of each granule of clay, which is in turn exposed to water in a predetermined time window, the time window being a function of variables such as coating thickness, the water solubility of the particular polymer used as the coating, and the temperature and nature of any fluids flowing in the well.

Other polymers, although not as preferable as PHPA, can be used as a coating for the clay granules so long as they are water soluble, water dispersible polymers which absorb the added water. Xanthan gum is one example of such a polymer, but is not as easily formed into an emulsion as is PHPA.

Variations of the preferred embodiment will be obvious to those skilled in this art. For example, the coated granules can be recycled through the coating process to result in two or more coatings, having the same or different coatings of the same polymer. As another example, the additional coating or coatings may involve the use of different polymers; coating 1 could be PHPA, coating 2 could be xanthan gum, etc.

To ensure even, controlled spraying of the granular sodium bentonite, we caused the granules to be rotated continuously by a conventional auger transport conveyor system, and subjected the granules to light spraying with the liquid emulsion PHPA copolymer and mineral oil liquid phase from eight sequentially spaced nozzles. While the liquid spray from the nozzles could occur at different flow rates, and the granular sodium bentonite particles could also be fed into the spray system at different rates, we found that by pumping the liquid at 1.25 to 1.50 gallons per minute onto the granular particles being fed into the auger transport system at the rate of 8.5 to 9.5 tons per hour, we were able to achieve the desired design parameter of "R", optimized to have a value of 0.042.

The value for R is derived as follows. R is not dimensionless, but rather has units of ml/gram. Thus, $$R = \frac{\text{volume (ml of liquid phase}}{\text{weight (grams) of solid phase}}$$

Using a flow rate of 1.42 gallons of liquid per minute, sprayed onto the clay particles being fed into the auger at 8.5 tons per hour (0.142 tons/min.), $$R = \frac{1.42 \frac{\text{gal.}}{\text{min.}}}{.142 \frac{\text{tons}}{\text{min.}}} = 10 \text{ gal.}/\text{ton}$$

$$= 10 \frac{\text{gal.}}{(\text{ton})} \times \frac{3785 \text{ ml}}{(1 \text{ gal.})} \times \frac{1 \text{ ton}}{(2000 \text{ lb.})} \times \frac{1 \text{ lb.}}{(454 \text{ grams})}$$

$$= \frac{10(3785)}{2000(454)} \frac{\text{ml}}{\text{gram}}$$

$$= 0.0417 \approx 0.042$$

As can be seen in Table 1, the coat thickness was monitored closely, as reflected in the liquid/solid ratio column, identified as "R", with the amount of sodium bentonite being the amount of the solid phase, and the volume of the liquid phase, viz., the combined liquid emulsion PHPA and the mineral oil being the "Liquid" identified in the ratio R.

In addition to controlling the coating thickness, another important design parameter is the size of the sodium bentonite granular particles, sometimes referred to herein as granules.

In combination, the coating thickness and the sodium bentonite granular particle size are both important to the practice of the present invention. The preferred embodiment contemplates a range of 0.03–0.045 for the Liquid/Solid ratio R, and more preferred, a ratio of 0.042 ml/gram. The preferred range of sodium bentonite particles is 8–20 mesh size, and even more preferably, from 8–14 mesh size, in the U.S. Standard Sieve System, ranging from 2.36 mm to 1.4 mm.

While Table 1 lists the variables used in the fourteen different formulations, Table 2 demonstrates the experimental results. Table 3 provides a listing of additional evaluation criteria. For example, while formulation FM-2 passed the 20% solids test in Table 2, it did not pass the slurry thickening time test of 6–10 minutes. In these various tests, only the formulations FM-3, FM-4, FM-5 and FM-13 met all of the most preferred criteria.

While another criteria "r" is listed, being the ratio of the volume of the absorbent to the amount of the solid, this value is proportional to the ratio R when maintaining the ratio constant of the absorbent to the carrier fluid. In the event the ratio of absorbent to carrier is other than 67/33%, it is important to maintain the ratio of r in the range of 0.2 to 0.3 ml/gram to control the thickness of the coating, all as described in Table 4.

Table 5 graphically describes the determination of the hydraulic conductivity of a 20% solids grout slurry of the present invention, thus demonstrating the low permeability of the slurry, a factor needed to plug or seal a wellbore.

Pumpability tests of the coated product according to the present invention were conducted by mixing 50 pounds of the coated clay granular product with various volumes of water to determine the pumpability of the slurry. The slurry pumped quite well through a 1 inch hose with respective volumes of water being 26, 28 and 30 gallons of water. The slurry did not pump as well when 50 pounds of the product were mixed with 24 gallons, or less, of water. Thus, in determining the pumpability of the slurry, the preferred slurry range indicated a slurry made up of 50 pounds of the coated product with 26–30 gallons of water.

Field Tests

Some of the initial field test were conducted using 30 gallons of water mixed with 50 pounds of the coated product in accordance with the present invention. The slurry was thin and would tend to settle if the mixing paddle speed was too slow. By cutting back to a water volume of 28 gallons of water per 50 pound bag of the coated product, the grouting field tests produced excellent results. The slurry remained a homogeneous mixture, with no individual particles. Thus, despite the fact that the slurry using the coated product will function with a slurry containing 30 gallons of water per 50 pound bag of the coated product, the optimized slurry will use 28 gallons of water per 50 pound bag of the coated product.

In yet another field test, an effort was made to plug a flowing well having an initial depth of 65 feet. The flowing water was encountered at a depth of 35 feet, at a rate of approximately 55 gallons per minute. Conventional methods using cement were used in the initial attempts to plug the well, but were unsuccessful, producing little or no reduction in the water flow. Following the unsuccessful attempts to plug the flowing well with cement, and also an unsuccessful attempt to pressure up the flowing well to force the cement slurry into the formation surrounding the well, the decision was made to field test the coated product according to the present invention.

A first slurry was mixed having 75 pounds of the coated product in 25 gallons of water. As the first slurry was being pumped into the well using a Moyno slurry pump, a second slurry was mixed, also having 75 pounds of the coated product to 25 gallons of water. A total of 54 gallons of slurry had been pumped when the water flow from the well ceased. As the equipment was being removed from the interior of the well, an additional slurry of 100 pounds of the coated product, mixed with 50 gallons of water, was used to fill the well. There was no water flowing out of the well. The wellbore was filled to within a few feet of the earth's surface with the slurry, and the remainder filled with native soil. The initial 54 gallons of slurry had a density of 10.5 pounds per gallon, while the final slurry, due to the thickening effect, and the time required to put it in place, had a density of approximately 9.8 to 9.9 pounds per gallon.

Thus it should be appreciated that while the coated product of the present invention will function in ratios of less than 26 gallons of water per 50 pounds of the coated product, for example, the slurry used in sealing the flowing well having approximately 17 gallons (16.67) of water per 50 pound bag of the coated product, the most preferred slurry according to the present invention uses 28 gallons of water per 50 pound bag of the coated product, for the reasons associated with the pumpability of the slurry, all as discussed above.

TABLE 1

Various Formulations of the Present Invention

| Exp. No. | Formulation No. | Solid Phase | Liquid/Solid ratio, R | Liquid Phase | | | | Absorbent to Solid ratio, "r" |
|---|---|---|---|---|---|---|---|---|
| | | | | Absorbent, | Wt, % | Carrier, | Wt, % | |
| 1 | FM-1 | 8–10 mesh clay | 0.01 | liquid PHPA | 67 | mineral oil | 33 | 0.0067 |
| 2 | FM-2 | 8–10 mesh clay | 0.019 | liquid PHPA | 67 | mineral oil | 33 | 0.013 |
| 3 | FM-3 | 8–10 mesh clay | 0.03 | liquid PHPA | 67 | mineral oil | 33 | 0.02 |
| 4 | FM-4 | 8–10 mesh clay | 0.042 | liquid PHPA | 67 | mineral oil | 33 | 0.028 |
| 5 | FM-5 | 8–10 mesh clay | 0.045 | liquid PHPA | 67 | mineral oil | 33 | 0.03 |
| 6 | FM-6 | 8–10 mesh clay | 0.06 | liquid PHPA | 67 | mineral oil | 33 | 0.04 |
| 7 | FM-7 | 8–10 mesh clay | 0.075 | liquid PHPA | 67 | mineral oil | 33 | 0.05 |
| 8 | FM-8 | 8–10 mesh clay | 0.029 | water repellent | 17 | mineral oil | 83 | 0.005 |
| 9 | FM-9 | 8–10 mesh clay | 0.059 | water repellent | 17 | mineral oil | 83 | 0.01 |
| 10 | FM-10 | 16–20 mesh clay | 0.042 | liquid PHPA | 67 | mineral oil | 33 | 0.028 |
| 11 | FM-11 | 16–20 mesh clay | 0.042 | liquid PHPA | 67 | mineral oil | 33 | 0.028 |
| 12 | FM-12 | 30–40 mesh clay | 0.042 | liquid PHPA | 67 | mineral oil | 33 | 0.028 |

TABLE 1-continued

Various Formulations of the Present Invention

| Exp. No. | Formulation No. | Solid Phase | Liquid/Solid ratio, R | Liquid Phase Absorbent, | Wt, % | Carrier, | Wt, % | Absorbent to Solid ratio, "r" |
|---|---|---|---|---|---|---|---|---|
| 13 | FM-13 | 10–14 mesh clay | 0.042 | liquid PHPA | 67 | mineral oil | 33 | 0.028 |
| 14 | FM-14 | ⅜" size clay | 0.042 | liquid PHPA | 67 | mineral oil | 33 | 0.028 |

The preferred compositions of the present invention.

TABLE 2

Grout Slurry (20% Solids) Performance Test

| Exp. No. | Formulation No. | Cup test[1] | Slurry thickening time[2], minutes | Slurry shear strength[3] 8 hours set time, lb/100 ft[2] |
|---|---|---|---|---|
| 15 | FM-1 | Fail-thick[4] | <3 | >2500 |
| 16 | FM-2 | Pass[5] | 4–5 | 2000–2250 |
| 17 | FM-3 | Pass | 6–7 | 1600–1750 |
| 18 | FM-4 | Pass | 8–9 | 1250–1350 |
| 19 | FM-5 | Pass | 9–10 | 1000–1150 |
| 20 | FM-6 | Pass | 10–11 | 800–950 |
| 21 | FM-7 | Fail-thin[6] | >14 | <500 |
| 22 | FM-8 | Fail-thick | <3 | >2500 |
| 23 | FM-9 | Fail-thick | <3 | >2500 |
| 24 | FM-10 | Pass | 4–5 | 850–950 |
| 25 | FM-11 | Pass | 3–4 | 1500–1600 |
| 26 | FM-12 | Fail-thick | <3 | >2500 |
| 27 | FM-13 | Pass | 10–11 | 1200–1300 |
| 28 | FM-14 | Fail-thick | <3 | >2500 |

[1]Cup test was conducted by mixing 43 grams of dry solid grout with 175 ml tapwater to provide grout slurry with 20% solids.
[2]Slurry thickening time is defined as the time interval when the slurry is no longer pumpable.
[3]Slurry shear strength measured by Baroid's Shearometer as a function of time.
[4]"Fail-thick" means that the slurry consistency is too thick to flow freely and it contains clay lumps.
[5]"Pass" means that the slurry consistency is a homogeous mix.
[6]"Fail-thin" means that the slurry consistency is thin enough to cause separation of solids.

TABLE 3

Grout Formulation Evaluation Criteria
Criteria I: Desirable grout slurry (20% solids) thickening time (t); Range 6 minutes < t < 10 minutes
Criteria II: Desirable grout slurry (20% solids) shear strength (P) measured at 8 hours set; Range 1000 lb/100 ft[2] < P < 2000 lb/100 ft[2]

| Formulation No. | Criteria I | Criteria II | Meet Both I & II | R | r |
|---|---|---|---|---|---|
| FM-2 | no | yes | no | — | — |
| FM-3 | yes | yes | yes | 0.030 | 0.02 |
| FM-4 | yes | yes | yes | 0.042 | 0.028 |
| FM-5 | yes | yes | yes | 0.045 | 0.030 |
| FM-6 | no | no | no | — | — |
| FM-10 | no | no | no | — | — |
| FM-11 | no | yes | no | — | — |
| FM-13 | yes | yes | yes | 0.042 | 0.028 |

TABLE 4

Optimization of Variables of the Present Invention

| Clay Particle Size Distribution | Liquid (volume) of Solid (mass) Ratio, "R" | Absorbent (volume) Solid (mass) Ratio, "r" |
|---|---|---|
| 8 (2.36 mm) to 14 mesh (1.4 mm) (U.S. Standard Sieve No.) | 0.03 to 0.045 | 0.02 to 0.03 |

TABLE 5

Determination of Hydraulic Conductivity* of a 20% Solids Grout Slurry of the Present Invention

| Test Duration, hours | Hydraulic conductivity, cm/sec |
|---|---|
| 7 | $6.1 \times 10^{-8}$ |
| 23 | $2.3 \times 10^{-8}$ |
| 47 | $1.3 \times 10^{-8}$ |
| 79 | $1.1 \times 10^{-8}$ |
| 144 | $8.1 \times 10^{-9}$ |
| 193 | $7.8 \times 10^{-9}$ |
| 222 | $1.0 \times 10^{-8}$ |
| 311 | $7.4 \times 10^{-9}$ |

*Hydraulic Conductivity determination was conducted under the following conditions:
Method: constant head with fixed-wall cell
Permeation fluid: tapwater
Hydrostatic head: 46.2 feet water head
Compaction: none (undisturbed, free swelling)
Sample cell: 3" (diameter) & 2" (height)
Gradient: 277

What is claimed is:

1. A composition for use in sealing, grouting or plugging an earth borehole, comprising:
   granular bentonite particles with an external water soluble, absorbent coating thickness.

2. The composition according to claim 1, wherein the ratio of the liquid volume of said coating to the mass of said granular particle is in the range of about 0.03 to about 0.5 ml/gram.

3. The composition according to claim 1, wherein said granular particles comprise sodium bentonite.

4. The composition according to claim 3, where said granular particles comprise are sized between about 8 mesh and about 20 mesh.

5. The composition according to claim 3, wherein said granular particles are sized between about 8 mesh and about 14 mesh.

6. The composition according to claim 1, wherein said coating comprises a copolymer of polyacrylamide and polyacrylate in liquid emulsion form.

7. The composition according to claim 6, wherein said coating further a mineral oil carrier.

8. The composition according to claim 7 wherein said coating comprises about two thirds by weight liquid emulsion and about one third by weight carrier.

9. The composition according to claim 8, wherein said liquid emulsion comprises about one-third by weight copolymer and about two thirds by weight carrier fluid.

10. The composition according to claim 7 wherein said carrier liquid in said emulsion is mineral oil.

11. The composition according to claim 1, wherein said coating has a controlled thickness.

12. The composition according to claim 1 wherein the ratio of the aborbent comprising said coating to the mass of said granular particle is in the range of about 0.2 to about 0.3 ml/gram.

13. The composition of claim 1 wherein said coating has multiple layers.

14. The composition of claim 13 wherein at least one of said multiple layers is comprised of an emulsion of partially polyacrylamide.

15. A method of sealing, grouting or plugging an earth borehole, comprising:
coating granular bentonite particles to produce a complete coating of a controlled thickness on the surface of said particles;
adding said coated particles to water to form a slurry comprising from about 17 gallons to about 30 gallons of water for each 50 pounds of coated bentonite particles; and
pumping said slurry into said earth borehole.

16. The method according to claim 15, wherein the ratio of the liquid volume of said coating to the mass of said granular particles is in the range of about 0.03 to about 0.05 ml/gram.

17. The method according to claim 16, wherein said ratio is about 0.042 ml/gram.

18. The method according to claim 15, wherein said granular particles comprise sodium bentonite.

19. The method according to claim 15, wherein said granular particles are sized between about 8 mesh and about 20 mesh.

20. The method according to claim 15, wherein said granular particles are sized between about 8 mesh and about 14 mesh.

21. The method according to claim 15, wherein said coating comprises an emulsion of a copolymer of polyacrylamide and polyacrylate.

22. The method according to claim 21, wherein said coating also comprises a mineral oil carrier.

23. The method according to claim 22, wherein said liquid emulsion copolymer and said carrier are present in said coating in percentages, by weight, of about two thirds and about one third, respectively.

24. The method according to claim 21 wherein said emulsion also comprises a carrier fluid.

25. The method according to claim 24, wherein said emulsion comprises about one third by weight copolymer and about two-thirds by weight carrier fluid.

26. The method according to claim 24 wherein said carrier fluid in said emulsion is mineral oil.

27. The method according to claim 15, wherein said slurry comprises about 24 gallons of water for each 50 pounds of coated bentonite particles.

28. A method for preparing clay granules for use in sealing, grouting, or plugging a subterranean welbore, comprising coating said granules with an emulsion of water soluble, water dispersable polymers capable of absorbing water.

29. The method of claim 28 wherein said clay granules comprise sodium bentonite.

30. The method of claim 28 wherein the ratio of the volume of polymers in said coating to the amount of granules is about 0.03 to about 0.05 milliliters per gram.

31. The method of claim 28 wherein said coating on said granules is obtained by spraying said granules with the coating.

32. The method of claim 31 further comprising rotating said granules during said spraying.

33. The method of claim 28, wherein said emulsion is comprised of a co-polymer of polyacrylamide and polyacrylate.

34. The method of claim 33, wherein the emulsion is further comprised of a carrier fluid.

35. The method claim 34 wherein said carrier fluid is mineral oil.

36. The method claim 35 wherein said polymer comprises about one third of said emulsion and said mineral oil comprises about two-thirds of said emulsion.

37. The method of claim 36 wherein the ratio of the liquid volume of the coating to the weight of the granules is about 0.04 to about 0.05.

38. The method of claim 28 wherein said coating is applied in more than one application to the granules.

39. The method of claim 38 wherein at least one of said applications is of an emulsion comprising a polymer different from the polymer used in another of said applications.

40. The method of claim 39 wherein said different polymers are partially hydrolyzed polyacrylamide and xanthan gum.

41. A sealant for use in an underground formation comprising clay granules with a coating comprising a water soluble, water dispersable polymer emulsion capable of absorbing water.

* * * * *